(12) United States Patent
Sauvage-Vincent

(10) Patent No.: US 10,464,366 B2
(45) Date of Patent: Nov. 5, 2019

(54) PLASMONIC OPTICAL SECURITY COMPONENT, PRODUCTION OF SUCH A COMPONENT AND A SECURE DOCUMENT EQUIPPED WITH SUCH A COMPONENT

(71) Applicant: SURYS, Bussy Saint Georges (FR)

(72) Inventor: Jean Sauvage-Vincent, Saint Maur les Fosses (FR)

(73) Assignee: SURYS, Bussy Saint Georges (FR)

(*) Notice: Subject to any disclaimer, the term of this patent is extended or adjusted under 35 U.S.C. 154(b) by 0 days.

(21) Appl. No.: 15/115,318

(22) PCT Filed: Dec. 24, 2014

(86) PCT No.: PCT/EP2014/079321
§ 371 (c)(1),
(2) Date: Nov. 30, 2016

(87) PCT Pub. No.: WO2015/113718
PCT Pub. Date: Aug. 6, 2015

(65) Prior Publication Data
US 2017/0225502 A1    Aug. 10, 2017

(30) Foreign Application Priority Data
Jan. 31, 2014  (FR) .................................... 14 50766

(51) Int. Cl.
*B42D 25/328* (2014.01)
*B42D 25/23* (2014.01)
(Continued)

(52) U.S. Cl.
CPC .......... *B42D 25/328* (2014.10); *B42D 25/23* (2014.10); *B42D 25/29* (2014.10); *B42D 25/324* (2014.10);
(Continued)

(58) Field of Classification Search
CPC .... B42D 25/328; B42D 25/351; B42D 25/23; B42D 25/29; B42D 25/373; G02B 5/1814; G02B 5/1809; G02B 5/1861; G02B 5/008
(Continued)

(56) References Cited

U.S. PATENT DOCUMENTS

2008/0231976 A1* 9/2008 Commander ............. B44F 1/10
                                                                  359/833
2010/0307705 A1* 12/2010 Rahm ..................... B42D 25/29
                                                                  162/140
(Continued)

FOREIGN PATENT DOCUMENTS

CA      2832477 A1 * 10/2012  ............. G02B 5/008
EP      2151328 A1      2/2010
(Continued)

OTHER PUBLICATIONS

International Search Report issued in PCT/EP2014/079321 dated Apr. 10, 2015 (3 pages).
(Continued)

*Primary Examiner* — Justin V Lewis
(74) *Attorney, Agent, or Firm* — Osha Liang LLP

(57) ABSTRACT

The invention relates to a plasmonic optical security component comprising two layers (2, 4) made of transparent dielectric material and a metal layer (3) arranged between said transparent dielectric material layers in order to form two dielectric-metal interfaces (31, 32). The metal layer is structured to form, on a first coupling region, a first periodic, two-dimensional coupling array ($C_1$) which is capable of coupling surface plasmon modes, which are supported by said dielectric-metal interfaces, to an incident light ray, the first coupling array having a profile which does not have point symmetry in any of the directions thereof, and, on a second coupling region, a second periodic, two-dimensional
(Continued)

coupling array ($C_2$) which is capable of coupling surface plasmon modes, which are supported by said dielectric-metal interfaces, to an incident light ray, the second coupling array having a profile which does not have point symmetry in any of the directions thereof and is different from that of the first coupling array.

7 Claims, 15 Drawing Sheets

(51) Int. Cl.
    *G02B 5/18*     (2006.01)
    *B42D 25/373*     (2014.01)
    *G02B 5/00*     (2006.01)
    *G02B 5/20*     (2006.01)
    *G02B 27/32*     (2006.01)
    *B42D 25/29*     (2014.01)
    *B42D 25/351*     (2014.01)
    *B42D 25/45*     (2014.01)
    *B42D 25/324*     (2014.01)

(52) U.S. Cl.
    CPC ......... *B42D 25/351* (2014.10); *B42D 25/373* (2014.10); *B42D 25/45* (2014.10); *G02B 5/008* (2013.01); *G02B 5/1809* (2013.01); *G02B 5/1814* (2013.01); *G02B 5/1861* (2013.01); *G02B 5/204* (2013.01); *G02B 27/32* (2013.01)

(58) Field of Classification Search
    USPC .......................... 283/72, 74, 75, 83, 94, 98
    See application file for complete search history.

(56) References Cited

U.S. PATENT DOCUMENTS

2014/0028012 A1*   1/2014   Petiton ................... G02B 5/008
                                                                                                               283/85
2014/0085725 A1*   3/2014   Lochbihler ............ G02B 5/204
                                                                                                               359/568

FOREIGN PATENT DOCUMENTS

| JP | 2008-275740 A | 11/2008 |
|---|---|---|
| JP | 2012-123102 A | 6/2012 |
| WO | 2012/156049 A1 | 11/2012 |
| WO | 2013/060817 A1 | 5/2013 |
| WO | 2014/023415 A1 | 2/2014 |
| WO | 2014/072358 A1 | 5/2014 |

OTHER PUBLICATIONS

Written Opinion of the International Searching Authority issued in PCT/EP2014/079321 dated Apr. 10, 2015 (5 pages).
French Search Report issued in FR 1450766 dated Sep. 30, 2014 (2 pages).

* cited by examiner

Reflection

Transmission

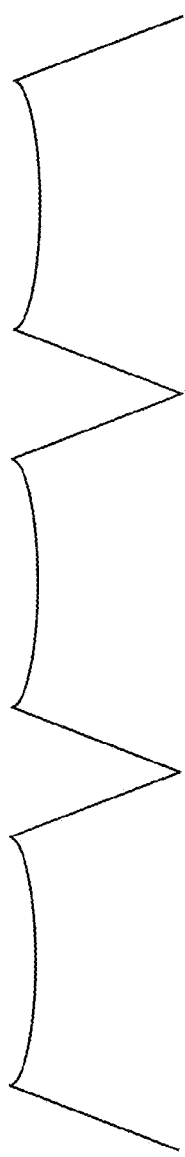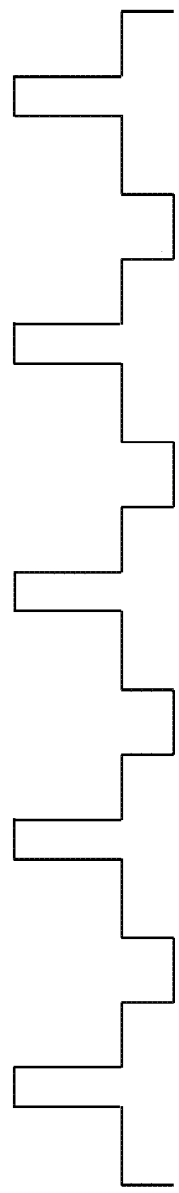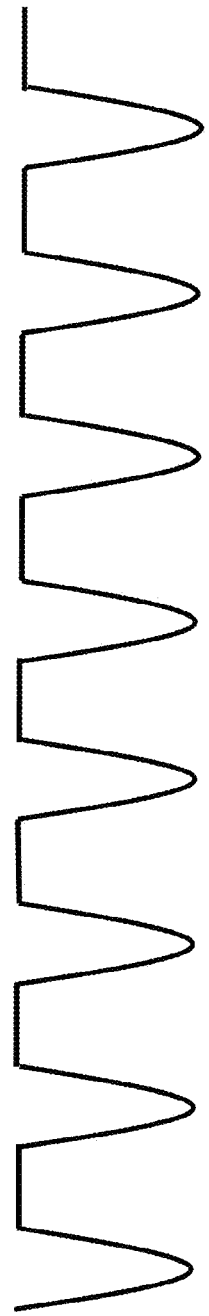

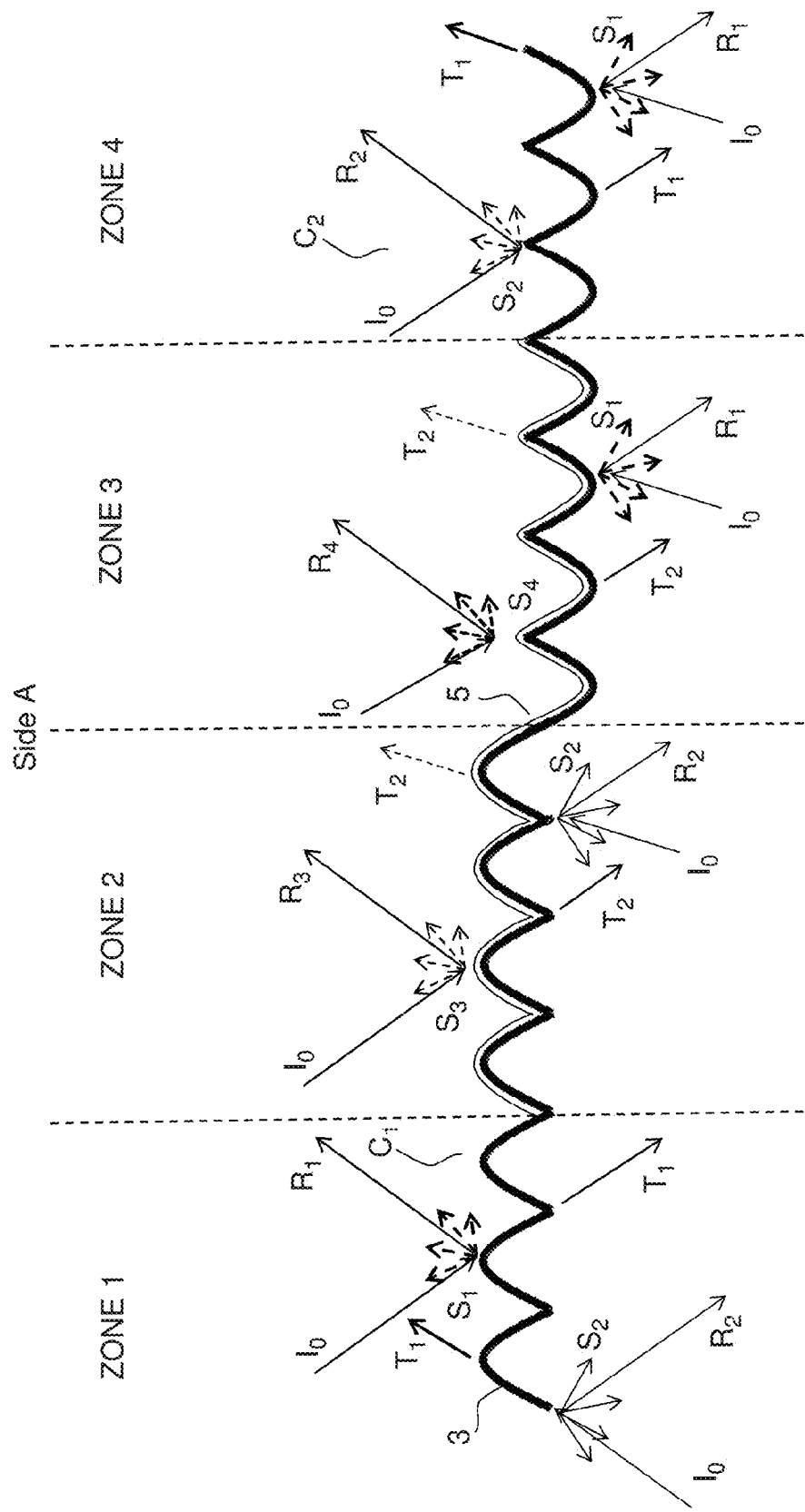

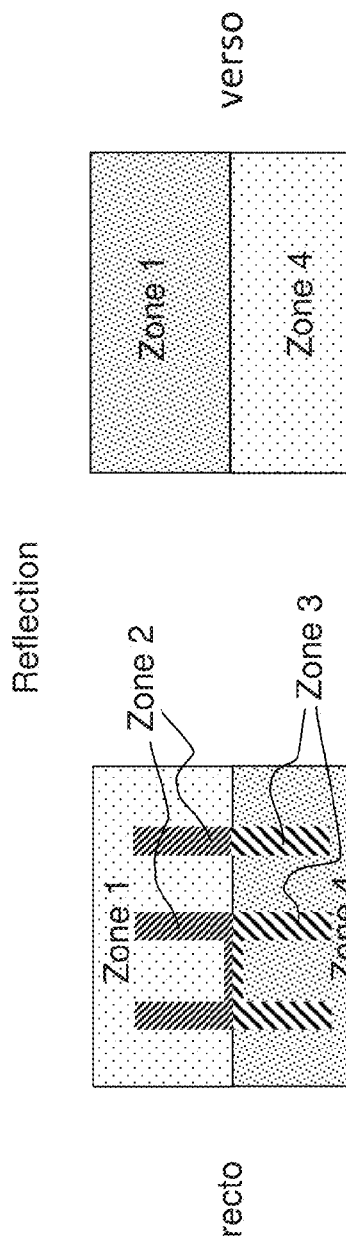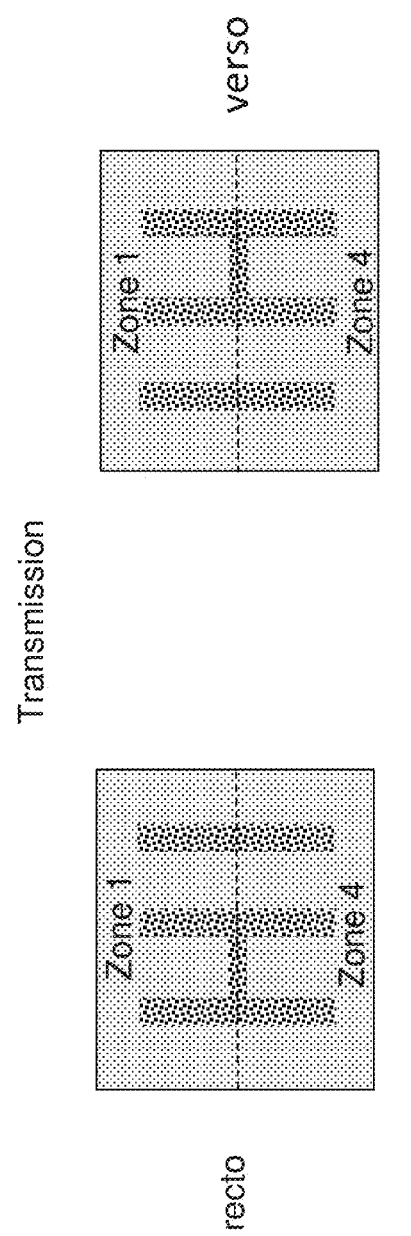

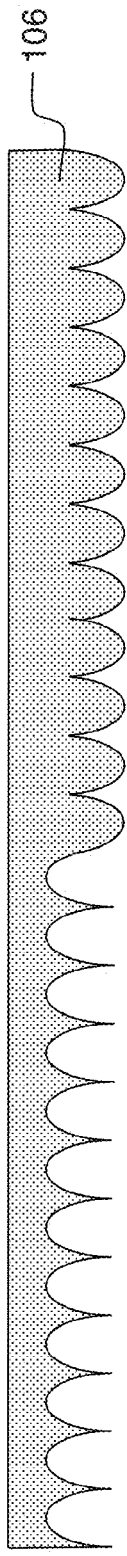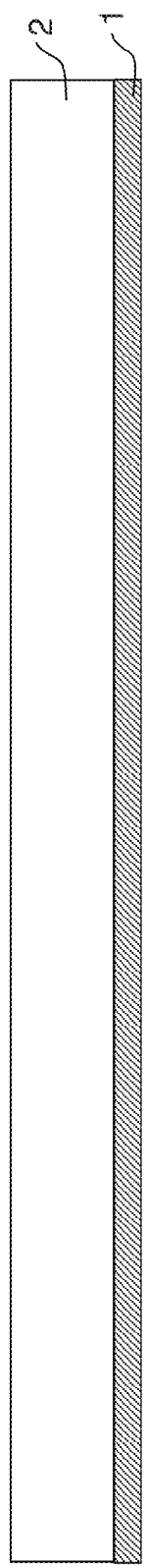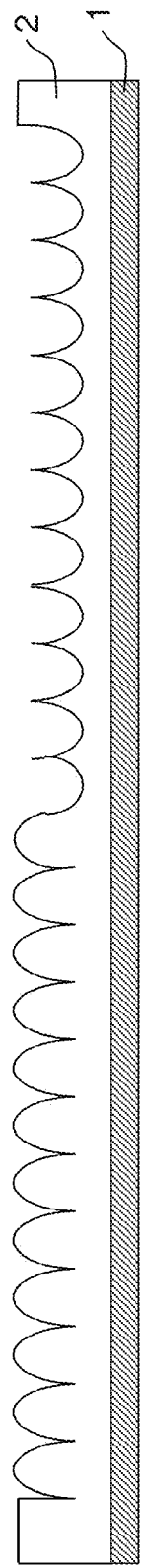
FIG.10A
FIG.10B

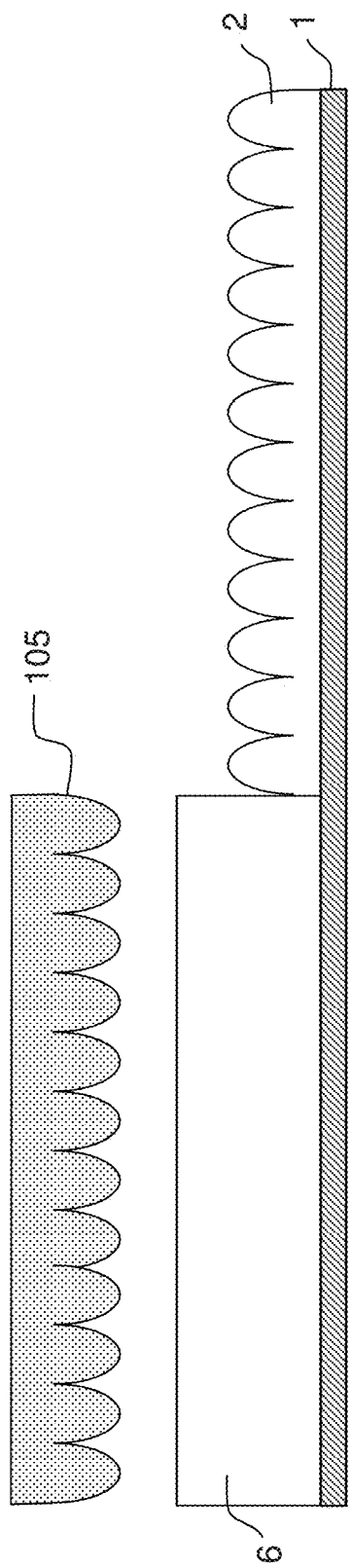
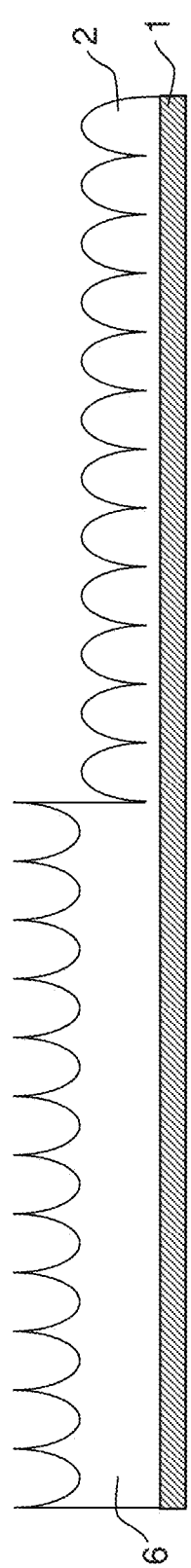
FIG.11C
FIG.11D

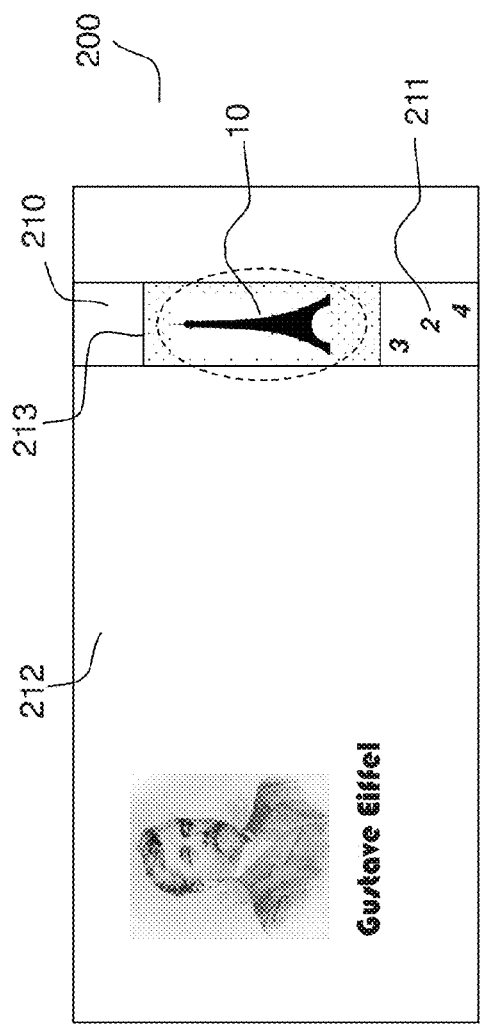
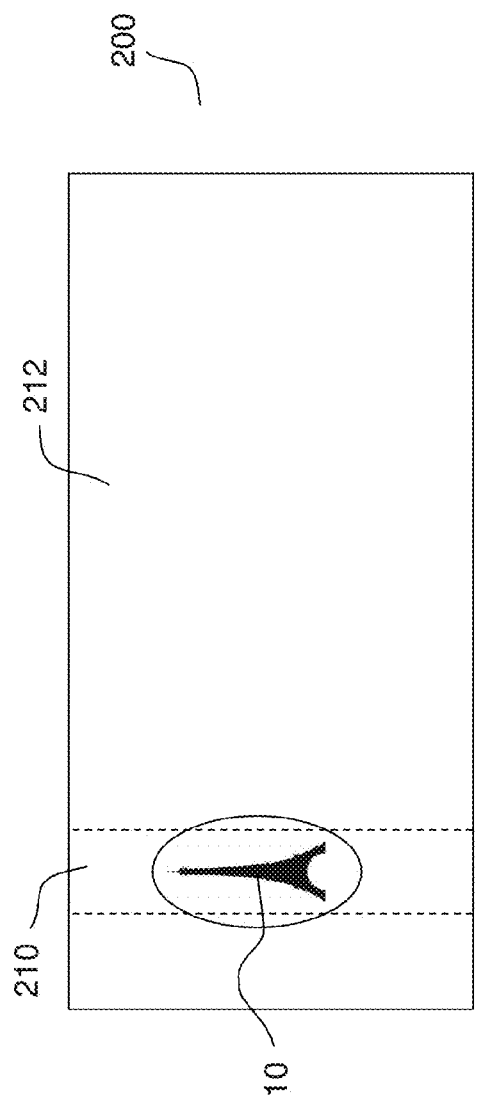

PLASMONIC OPTICAL SECURITY COMPONENT, PRODUCTION OF SUCH A COMPONENT AND A SECURE DOCUMENT EQUIPPED WITH SUCH A COMPONENT

FIELD OF THE DISCLOSURE

The present disclosure relates to the field of security markings. More particularly it relates to a security optical component presenting different optical effects in reflection from its recto and verso faces, to a method for manufacturing such a component and to a secure document equipped with such a component.

PRIOR ART

Many technologies are known that allow documents or products to be authenticated and, in particular, documents of value such as banknotes, passports or other identification documents to be made secure. These technologies aim to provide security optical components the optical effects of which adopt very characteristic and verifiable configurations depending on observation parameters (orientation with respect to the axis of observation, position and dimensions of the light source, etc.). The general aim of these optical components is to create novel and differentiating effects from difficultly reproducible physical configurations.

Among these components, optical components that produce diffractive and variable images are referred to as DOVIDs for "diffractive optical variable image devices" or, more commonly, as holograms. These components are generally observed in reflection.

Other security optical components are known that allow a component to be authenticated by observation in transmission.

Thus, French patent FR 2973917 in the name of the Applicant describes a plasmonic-effect security optical component comprising two layers made of transparent dielectric and one metal layer arranged between the dielectric layers so as to form two dielectric-metal interfaces, the metal layer being structured to form corrugations able to couple surface plasmon modes supported by the dielectric-metal interfaces to an incident light wave. Such a component exhibits an extraordinary transmission effect in a spectral band centered on a central wavelength defined by the characteristics of the corrugations of the coupling zones.

In the present application plasmonic-effect security optical components presenting effects in reflection that differ depending on whether the recto face or verso face of the component is observed are more particularly of interest.

SUMMARY OF THE DISCLOSURE

According to a first aspect, one or more embodiments relate to a plasmonic-effect security optical component, said optical component comprising two layers made of transparent dielectric, and one metal layer arranged between said transparent dielectric layers so as to form two dielectric-metal interfaces, said metal layer being structured to form, in a first coupling zone, a first periodic two-dimensional coupling grating able to couple surface plasmon modes supported by said dielectric-metal interfaces to an incident light wave, the first coupling grating having an asymmetric profile in each of its directions, and, in a second coupling zone, a second periodic two-dimensional coupling grating able to couple surface plasmon modes supported by said dielectric-metal interfaces to an incident light wave, the second coupling grating having an asymmetric profile in each of its directions, which profile is different from that of the first coupling grating when it is seen from the same side of the component as the first coupling grating.

The second coupling grating may be the negative of the first coupling grating. Furthermore, whether the second coupling grating is the negative of the first coupling grating or not, the pitch of each coupling grating in each of its directions may be comprised between 100 nm and 600 nm and for example between 200 nm and 500 nm.

According to one or more embodiments, independently of the value of the pitch of the first coupling grating and of the second coupling grating, the height of at least one coupling grating may be comprised between 10% and 50% and for example between 10% and 49% or between 10% and 40% of the pitch of the coupling grating. According to one or more embodiments, when the second coupling grating is the negative of the first coupling grating, including, for example, when the pitch of each coupling grating in each of its directions is comprised between 100 nm and 600 nm, the height of each coupling grating may be comprised between 10% and 50% and for example between 10% and 49% or between 10% and 40% of the pitch of the corresponding grating.

A two-dimensional grating is a "crossed" grating formed from two one-dimensional gratings that intersect at right angles. It thus forms a structure having an "egg box" type shape. By asymmetric profile, what is meant in the present description is a grating the profile of which in one direction does not have central symmetry (with respect to a point).

Such a component exhibits, in the first and second coupling zones, an extraordinary transmission effect, in a spectral band centered on a given wavelength defined by the characteristics of the metal-dielectric interfaces and of the coupling grating in this zone.

Because of the asymmetric character of the profiles of the coupling gratings and of the difference between the asymmetric profiles of the first and second coupling gratings in the first and second coupling zones, if one side of the component is observed in reflection each zone is observed to create a different color effect; specifically, the spectral band of the reflected light wave depends not only on the spectral band of the transmitted wave but also on the spectral band of the scattered wave, which changes depending on the profile of the grating.

Moreover, the color effect created by each zone differs in reflection depending on which of the two faces of the component is observed; this is because the asymmetric character of the profile of each coupling grating causes the spectral band of the reflected wave observed on one side of the component to differ from that observed on the other side, this possibly also causing the light intensity reflected in a given spectral band to differ.

Each of the first and second coupling zones may be a variety of shapes, be composed of adjoining or non-adjoining portions, and may, in one or more embodiments, form a recognizable pattern. According to one or more embodiments, the two coupling zones may have complementary shapes.

According to one or more embodiments, the periods of each of the first and second coupling gratings are identical in the two directions. Each two-dimensional grating is thus made up of square unit cells, thereby making it possible to prevent the color of the component varying when it is rotated azimuthally.

According to one or more embodiments, the profile of each of the coupling gratings in one direction is a pseudo-sinusoidal profile, i.e. a profile that is not perfectly sinusoidal i.e. one with a duty cycle different from 0.5. The duty cycle of the pseudo-sinusoid is defined as the ratio, for example measured over one period, of the smallest of the lengths between the length over which the value of the pseudo-sinusoid is above the median value of the pseudo-sinusoid and the length over which the value of the pseudo-sinusoid is below the median value of the pseudo-sinusoid, to the total length of the period. For example, the duty cycle may be strictly lower than 40% (or 0.4), in order to generate a sufficient asymmetry and effects in reflection that clearly differentiate one side from the other.

According to one or more embodiments, the first and second coupling gratings have identical periods, such that the spectral band of the transmitted wave is substantially identical in each of the zones. Thus the appearance of each of the two faces of the component is the same when observed in transmission, whereas the effects observed in reflection differ because of the difference in the profiles of the gratings seen from the same side of the component.

According to one or more embodiments, the second coupling grating is the negative of the first coupling grating. This configuration allows an inversion in the colors of the first and second zones to be observed when the component is looked at from each of its sides, the profile of the first coupling grating seen from one side of the component being identical to the profile of the second coupling grating seen from the other side of the component.

According to one or more embodiments, the security optical component furthermore comprises, in one region of at least one of the metal-dielectric interfaces, a layer made of high-index or low-index dielectric, for example forming a recognizable pattern. By high or low index, what is meant is materials the refractive index of which differs from the refractive index of the dielectric with which it makes contact by an amount Δn larger than 0.2 in absolute value.

The presence of the high- or low-index layer causes a modification, in the region on which it is deposited, of the spectral band of the transmitted wave, allowing new zones to be created so as to generate variable color effects in transmission when the component is observed from a given side. However, in the region on which the high- or low-index layer is deposited, the color effects in transmission are identical whether the recto or verso of the component is observed. The high- or low-index layer also causes a modification, in the region on which it is deposited and on the side of the interface on which it is deposited, of the spectral band of the reflected wave, because of scattering effects. If the high- or low-index layer is deposited selectively on one metal-dielectric interface, the effect in reflection therefore differs depending on whether the component is observed from one side or the other. It is thus possible to observe in transmission a pattern of a certain color on a background of another color, these colors remaining the same whether the recto or verso of the component is observed. In reflection in contrast, the colors of the pattern differ depending on whether the component is observed from one side or the other.

According to one or more embodiments, the metal layer may furthermore comprise a non-structured zone. This zone, of high optical density, makes it possible to better showcase the zones in which the coupling gratings are arranged, which exhibit, in a given spectral band, an extraordinary transmission due to the plasmonic effect.

According to one or more embodiments, the first and second coupling gratings may have a pitch comprised between 100 nm and 600 nm and for example between 200 nm and 500 nm. According to one or more embodiments, their depth may be comprised between 10% and 50% of their pitch and for example between 10% and 49% or even between 10% and 40% of their pitch, a shallow coupling grating allowing the plasmonic modes to better propagate.

According to one or more embodiments, the difference in the refractive indices of said dielectrics, which are transparent in the targeted spectral band, for example the visible, and which form each of said layers, may be lower than 0.1, this making it possible to maximize the coupling and therefore the plasmonic transmission and therefore to obtain an optimal extraordinary transmission at said central wavelength.

According to one or more embodiments, the metal layer may be continuous over at least one section and chosen to be thin enough to allow the plasmonic modes propagating at the two metal-dielectric interfaces to couple. According to one or more embodiments, at least one section of the metal layer may be continuous and formed from silver. According to one or more embodiments, its thickness may be substantially comprised between 20 and 60 nm and for example between 35 nm and 45 nm. According to one or more embodiments, at least one section of the metal layer may be continuous and formed from aluminum. According to one or more embodiments, its thickness may be substantially comprised between 10 and 30 nm and for example between 15 nm and 25 nm.

According to one or more embodiments, the metal layer may be formed from a single metal. According to one or more embodiments, the metal layer comprises at least two sections each formed from a different metal. This may allow various visual effects to be created, both in reflection and in transmission, in the spectral band of the plasmonic effect.

According to a second aspect, one or more embodiments relate to a security optical element intended to make a document secure and comprising at least one security optical component according to the first aspect. The security element may comprise other security components, for example holographic components.

According to one or more embodiments and depending on the requirements of the final application, the security element comprises other layers; for example, the security element may comprise in addition to the active plasmonic-effect layers a carrier film bearing one of said layers made of transparent dielectric and/or an adhesive film placed on one of said layers made of transparent dielectric. These films are neutral as regards the plasmonic effect since they do not degrade or influence the dielectric-metal interface. They make it possible to facilitate the adhesion to the document to be made secure and/or an industrial implementation.

According to a third aspect, one or more embodiments relate to a secure document comprising a substrate and a security optical element according to the second aspect, the security optical element being fastened to said substrate, said substrate comprising a transparent zone in which said plasmonic-effect security optical component is arranged.

The secure document, for example a document of value such as a banknote or an authentication document such as an identity card may, by virtue of the plasmonic-effect security optical component according to the present disclosure, be easily checked in reflection and in transmission by comparing the color effects of each of its faces, and its resistance to counterfeiting is high because of the technology implemented.

According to one or more embodiments, the security optical component according to the first aspect or the security optical element according to the second aspect is encapsulated in the substrate of the secure document. Transparent zones are provided on either side of the security optical component, thus allowing a check to be carried out in reflection and in transmission on each of its sides.

According to a fourth aspect, one or more embodiments relate to a method for manufacturing a plasmonic-effect security optical component comprising:

depositing a metal layer on a structured first layer made of transparent dielectric, allowing a first structured metal-dielectric interface to be obtained; and encapsulating said metal layer with a second layer made of transparent dielectric, so as to form a second structured dielectric-metal interface, and wherein:

the two dielectric-metal interfaces are structured so as to form, in a first coupling zone, a first periodic two-dimensional coupling grating able to couple surface plasmon modes supported by said dielectric-metal interfaces to an incident light wave, the first coupling grating having an asymmetric profile in each of its directions, and, in a second coupling zone, a second periodic two-dimensional coupling grating able to couple surface plasmon modes supported by said dielectric-metal interfaces to an incident light wave, the second coupling grating having an asymmetric profile in each of its directions, which profile is different from that of the first coupling grating when it is seen from the same side of the component as the first coupling grating.

This method for manufacturing a security optical component is perfectly compatible with methods for manufacturing known prior-art security optical components and especially DOVID type components.

According to one or more embodiments, the method furthermore comprises manufacturing a first master for structuring the metal-dielectric interfaces in the first coupling zone in order to form the first coupling grating and manufacturing a second master for structuring the metal-dielectric interfaces in the second coupling zone in order to form the second coupling grating, the second master being a negative replica of the first master.

According to one or more embodiments, the method furthermore comprises depositing on a region of at least one of said metal-dielectric interfaces a layer made of high- or low-index dielectric.

BRIEF DESCRIPTION OF THE FIGURES

Other features and advantages of the optical component, of the optical element, of the secure document and of the method for manufacturing the optical component will become apparent on reading the following description, which is illustrated by the figures, which show:

FIGS. 5A to 5G, schematics respectively illustrating a sinusoidal function, pseudo-sinusoidal functions with various form factors and other asymmetric profiles;

FIG. 7, a schematic illustrating reflection, scattering and transmission effects from both sides of structured metal-dielectric interfaces in first and second zones comprising first and second coupling gratings, respectively, with a high-index dielectric layer deposited on a region of one of the interfaces;

FIGS. 8A to 8D, the visual effects seen when a component in a configuration such as illustrated in FIG. 7 is observed in reflection and in transmission from the recto and verso of the component;

FIGS. 10A to 10E, schematics illustrating the manufacture of a security optical component according to one example;

FIGS. 11A to 11F, schematics illustrating the manufacture of a security optical component according to one example; and FIGS. 12A and 12B, recto and verso views of a secure document comprising a security optical component according to the present description, respectively.

DETAILED DESCRIPTION

Figures 1, 2:
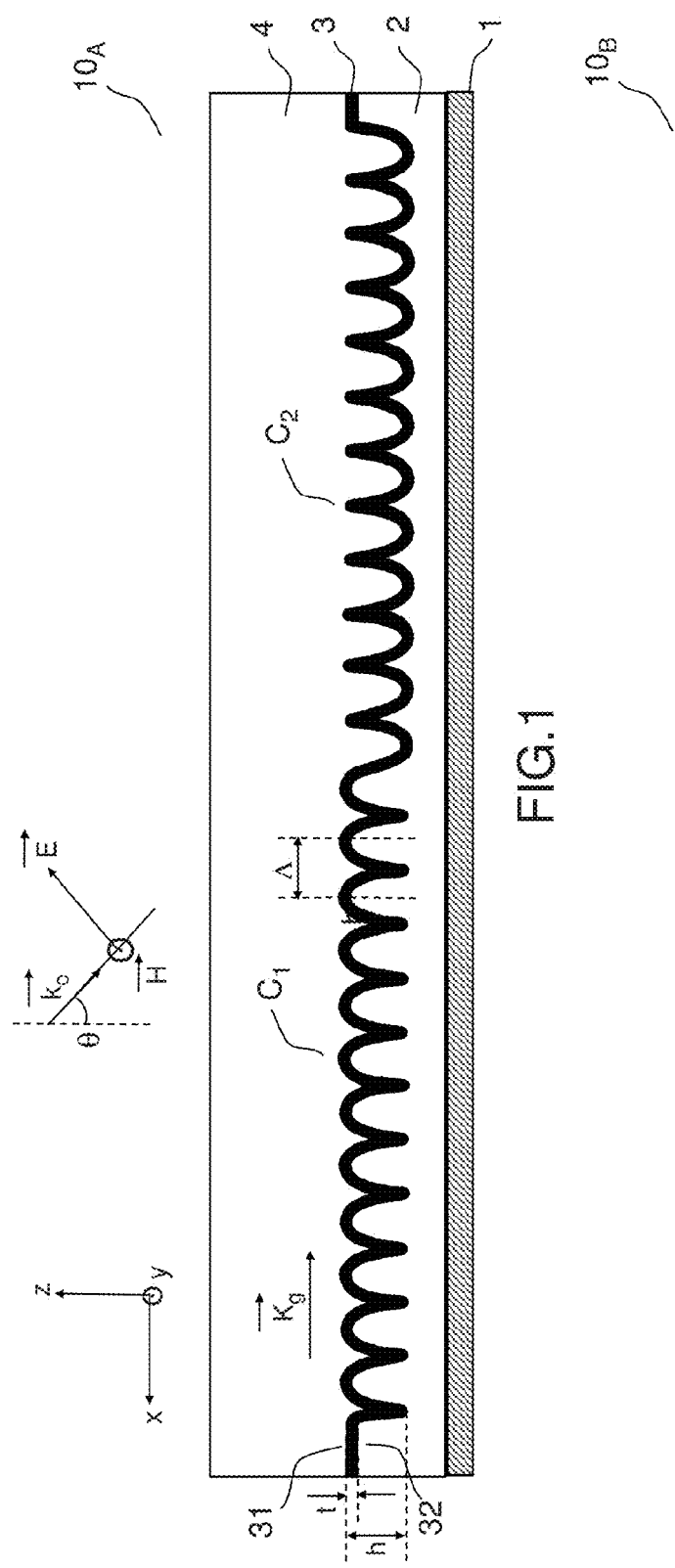
FIGS. 1 and 2, partial cross-sectional views of a security optical component according to the present description and according to two embodiments.

FIGS. 1 and 2 are partial views of cross-sectional views of security components $10_A$ and $10_B$ according to exemplary embodiments.

The security component according to one or more embodiments generally comprises a metal layer 3, for example a continuous layer, of substantially constant thickness, typically a few tens of nanometers, arranged between two layers 2, 4 made of transparent dielectric so as to form two dielectric-metal interfaces respectively referenced 32 and 31 in FIGS. 1 and 2. The metal may be any metal capable of supporting plasmon resonance, for example silver, aluminum, gold, chromium or copper. The dielectrics may be any dielectric material able to be "nondestructively associated" with the metal, i.e. any dielectric for which there is no risk of a physico-chemical reaction, for example oxidation, occurring that would degrade the effect to be checked. The dielectrics used for the layers 2 and 4 have substantially identical refractive indices, typically about 1.5, the difference in these indices advantageously being smaller than 0.1. For example, the dielectric layer 2 of refractive index $n_1$ is a layer made of polymer intended to be embossed and the layer 4 is an encapsulating layer made of a dielectric polymer of refractive index $n_2$ substantially equal to $n_1$. The layers 2 and 4 are transparent in the visible. In the example in FIG. 2, the security optical component $10_B$ furthermore comprises, in a region of at least one of said metal-dielectric interfaces, a layer 5 made of high- or low-index dielectric the effects of which will be detailed below. Advantageously, this assembly of layers is carried by a film 1 of 12 μm to 50 μm thickness made from a polymer, for example PET (polyethylene terephthalate). The function of the carrier film 1 may be to act as a carrier layer for the optical layers during the manufacturing method and possibly also to provide mechanical protection; it may be removable after the optical layers have been transferred to the final instrument, as will be detailed in greater detail below.

It is known that an interface between a conductor, for example a metal, and a dielectric may propagate a surface electromagnetic wave associated with a collective oscillation of surface electrons, which oscillation is referred to as a surface plasmon. This effect is for example described in the reference text by H. Raether ("Surface Plasmons", Springer- Verlag, Berlin Heidelberg). An incident light wave may be coupled to one or more plasmon modes in various ways, especially by structuring the interface to form a one or two-dimensional coupling grating.

This basic principle is implemented in the security component according to one or more embodiments to obtain noteworthy effects in transmission and reflection.

In the security component illustrated in FIG. 1 or 2, the metal layer 3 is structured to form, in a first coupling zone, a first two-dimensional coupling grating ($C_1$) able to couple surface plasmon modes supported by the dielectric-metal interfaces 31 and 32 to an incident light wave, and, in a second coupling zone, a second two-dimensional coupling grating ($C_2$) also able to couple surface plasmon modes supported by said dielectric-metal interfaces to an incident light wave. The first coupling grating $C_1$ and the second coupling grating $C_2$ are periodic and have an asymmetric profile in each of their directions, i.e. over one period the profile of each grating does not have symmetry. Various exemplary profiles with asymmetry in one direction will be detailed below. In each coupling zone, the metal layer is for example continuous and shaped in such a way as to form said coupling gratings. As is illustrated in FIG. 1, each grating is characterized in each of its directions by a pitch Λ, the amplitude (or depth) h of the grating, which is defined as the height between a peak and a trough, the thickness t of the metal layer in the coupling zone and its asymmetry. Typically, the pitch of a grating in each of the directions is comprised between 100 nm and 600 nm and advantageously between 200 nm and 500 nm, and the height is comprised between 10% and 50% of the pitch of the grating, and advantageously between 10% and 40%. Advantageously, the pitches of the gratings are identical in each direction, allowing variations in the color in reflection and/or transmission of the component when it is rotated azimuthally to be prevented. The thickness t of the metal layer must moreover be sufficiently small to allow surface plasmon modes to be excited and coupled at the two metal-dielectric interfaces and thus a resonant transmission effect to be obtained as will be described in more detail below.

An incident wave of TM polarization (i.e. a transverse magnetic wave i.e. a wave the magnetic field H of which is perpendicular to the plane of incidence xz, which is the plane of the figure in FIG. 1) is considered, this wave being incident on the grating at an azimuth of 0° to the grating vector $K_g$ and at an angle of incidence θ in the layer 4 to the y-axis normal to the grating plane formed by the corrugations 104 and an azimuth Φ. The grating vector $K_g$ (shown in FIG. 1) is the vector of direction perpendicular to the lines of the grating and of norm defined by $K_g=2\pi/\Lambda$ where Λ is the pitch of the grating.

In order for there to be coupling, i.e. for energy to be transferred between the wave incident on a dielectric medium of relative permittivity εd and the plasmon mode, the following equality (1) must be satisfied:

$$k_{sp} = \sqrt{(k_0 \cdot n_s \cdot \sin(\theta) \cdot \sin(\Phi))^2 + (k_0 \cdot n_s \cdot \sin(\theta) \cdot \cos(\Phi) + p \cdot K_g)^2} \quad (1)$$

Where:
$k_0$ is the wave number defined by $k_0=2\pi/\lambda$;
$n_s$ is the refractive index of the dielectric;
p is the order of diffraction; and
$k_{sp}$ is defined by $k_{sp}=n_{sp}k_0$, where $n_{sp}$ is the effective index of the propagating surface plasmon.

When the metal layer is of finite thickness and, in addition, its thickness is of the order of magnitude of the penetration depth of the electromagnetic field of the plasmon mode in the metal (which is about $1/(k_0(n_{sp}^2+Re(|\varepsilon_m|))^{1/2})$), the electromagnetic field of the plasmon mode at the upper interface of the metal layer also "sees" the lower interface and must therefore also satisfy the field boundary conditions at this lower interface. It follows that there are then two plasmon modes that can propagate along the metal layer, both of which have a maximal field at the upper and lower interfaces of the metal layer: a plasmon mode called the long-range plasmon mode the transverse magnetic field H of which is even (the longitudinal electric field, responsible for the longitudinal oscillation of the electrons, therefore being uneven i.e. it passes through zero in the metal layer), and a plasmon mode called the short-range plasmon mode the H field of which is uneven, and which is more highly absorbed by the metal. Their effective indices are similar when the thickness of the metal layer is not too small (larger than 15 nm, for example) and these modes are both coupled to in the presence of a grating when the incident wave originates from a light source that is weakly coherent both spatially and temporally, such as an incandescent lamp or natural light from the Sun. Thus, when the coupling conditions are satisfied, the field of the two coupled (or "excited") plasmon modes also possesses a maximum at the lower interface of the metal layer, and may therefore, by virtue of the presence of the grating, radiate into the transmission medium and thus allow light energy to pass through the continuous metal layer and thus produce a transmission peak, hence the term "resonant transmission".

In this case, the effective index of the plasmon may be approximated by the following equation (2):

$$n_{sp} \cong n_s + \frac{1}{2n_s}\left(\frac{k_0(n_s^2-\varepsilon_m)wn_s^2}{2\varepsilon_m}\right)^2 \quad (2)$$

where $\varepsilon_m$ is the permittivity of the metal.

Figure 3:
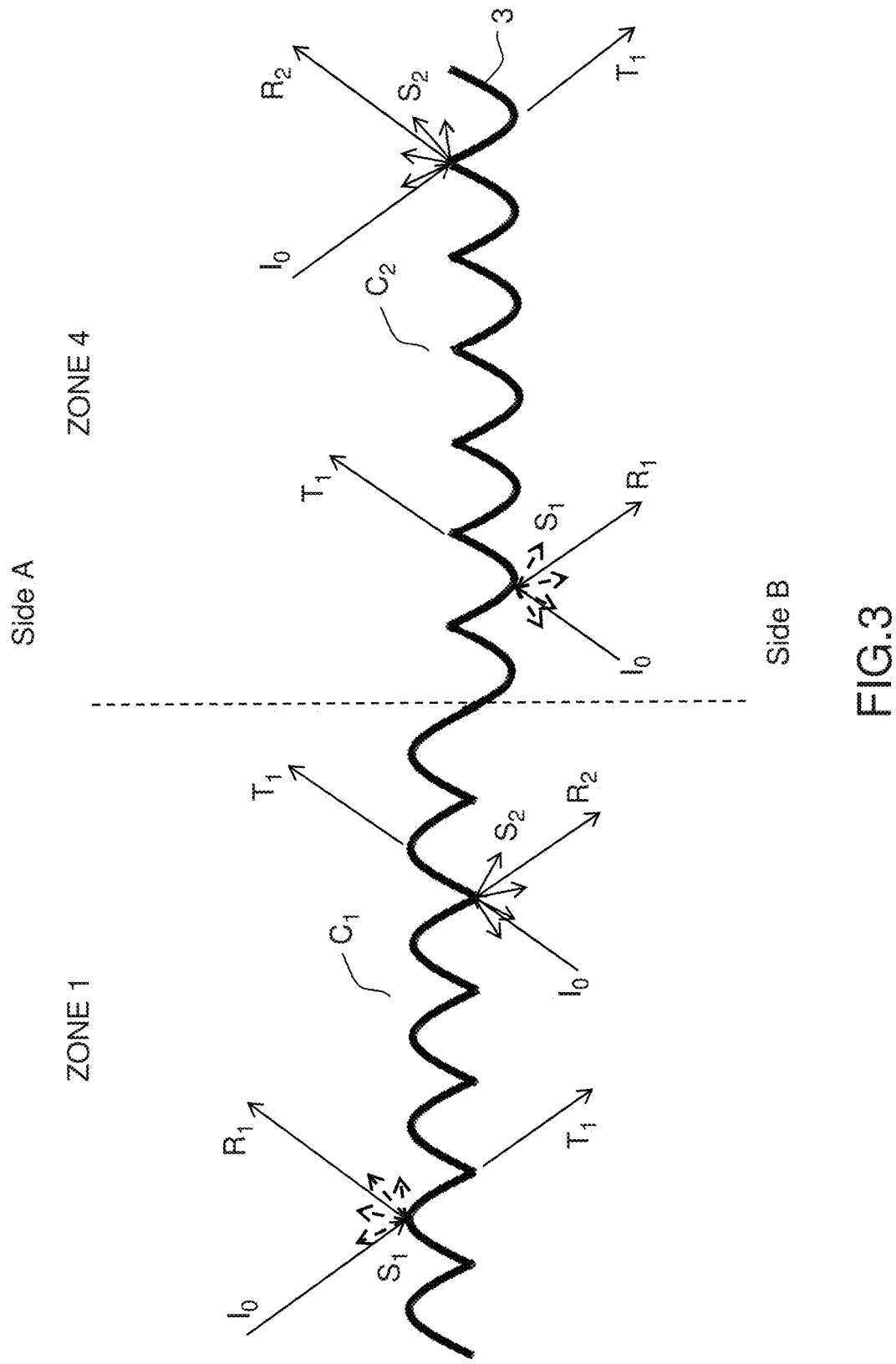
FIG. 3, a schematic illustrating reflection, scattering and transmission effects from both sides of structured metal-dielectric interfaces in first and second coupling zones comprising first and second coupling gratings, respectively.

The effects of the asymmetry of the gratings according to a first embodiment illustrated in FIGS. 3 and 4. FIG. 3 shows a simplified cross-sectional view of an exemplary security optical component according to the present description and FIG. 4 illustrates the visual effects obtained with this component in reflection and in transmission, on each of sides A (recto) or B (verso).

In FIG. 3, only the metal layer 3 is shown, the metal layer 3 being structured to form, as in FIG. 1, a first coupling grating $C_1$ in a first coupling zone ("zone 1") and a second coupling grating $C_2$ in a second coupling zone ("zone 4"). The first and second gratings are asymmetric, and in this example, one is the negative of the other. As a result, the first coupling grating $C_1$ viewed from a first side of the component (side A for example) looks identical to the second coupling grating $C_2$ seen from the other side of the component (side B), and vice versa.

The asymmetry of each of the gratings $C_1$ and $C_2$ especially causes the extension of the electric field of the "long-range" plasmon mode propagating along the two interfaces 31, 32 to be different at each of the dielectric-metal interfaces, this resulting in losses at the interfaces and in an extraordinary transmission at the coupling wavelength that is less effective than with a perfectly symmetric grating, such as a sinusoidal grating for example. As in this example the period of each of the gratings is the same no matter which side of the component they are viewed from, the coupling wavelength at which the extraordinary transmission is observed is the same on both sides of the component; however, the losses at the interfaces on each of the sides differ because of the asymmetry of the gratings. As a result, the reflection of the incident light, the light intensity of which is equal to the intensity of the incident wave after subtraction of the intensity of the transmitted wave and the intensity of the light flux diffracted or scattered at the interfaces, differs depending on whether the component is observed from one side or the other.

Figure 4A:
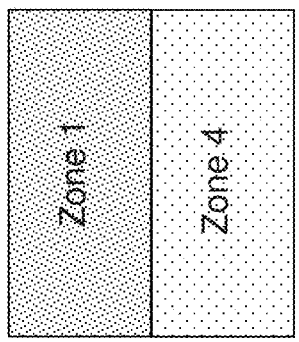
FIGS. 4A to 4D, the visual effects seen when a component in a configuration such as illustrated in FIG. 3 is observed in reflection and in transmission from the recto and verso of the component.
Figure 4C:
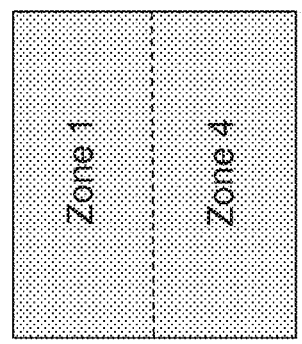
Figure 4B:
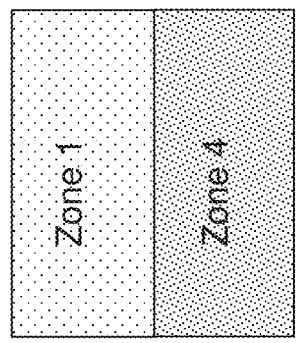
Figure 4D:
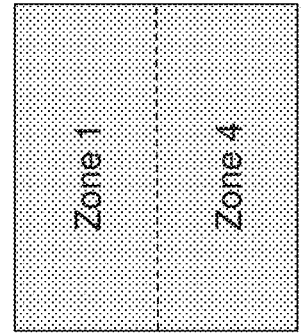

Thus, in the example in FIG. 3, if the light intensity of an incident wave is denoted $I_0$, an identical extraordinary transmission $T_1$ centered on a central coupling wavelength is observed in zone 1 no matter which side of the component is observed. In the zone 4, as the grating $C_2$ is the negative of the grating $C_1$ the periods of these two gratings are identical, and once again, in this zone, the same transmission $T_1$ is observed. Thus when observed in transmission, the color of the security optical component will be uniform over both zones, the color being the same whether the recto or verso of the component is observed, as is illustrated in FIGS. 4B and 4D.

In contrast, because of the asymmetry of the gratings $C_1$ and $C_2$, the intensity and spectrum of the losses due to diffraction and scattering differ depending on whether the recto or verso of the component is observed. Thus, when zone 1 is observed from the recto (side A) of the component, the losses due to diffraction and scattering, which are symbolized in FIG. 3 by the arrows $S_1$, will be different from the losses due to diffraction and scattering, which are symbolized in FIG. 3 by the arrows $S_2$, observed from the verso (side B) of the component. As a result, the spectrum and intensity of the reflection observed on the recto, and referenced $R_1$ in FIG. 3, will be different from the reflection observed on the verso, and referenced $R_2$ in FIG. 3. As in zone 4 the grating $C_2$ is the negative of the grating $C_1$ in zone 1, the effects in reflection will be inverted between the zone 4 and the zone 1. In other words, in the zone 4 a reflection $R_2$ will be observed on the recto (side A) and a reflection $R_1$ on the verso (side B). This effect is schematically shown in FIGS. 4A and 4C, which show the recto and verso of the security optical component as seen in reflection. The appearance of the component remains the same whatever the azimuthal orientation of the component if the deformation of the profile is present in both the 2 directions.

Such a security optical component thus has a first level of authentication as a result of the difference in the appearance of the component in reflection and in transmission (the two zones appear identical in transmission whereas the visual effect in reflection differs from one zone to the other). The security optical component has a second level of authentication as a result of the inversion in the visual effect in reflection from one zone of observation to the next (here from zone 1 to zone 4) because of the particular structure of the two asymmetric-profile gratings each of which is the negative of the other.

The expression "asymmetric-profile grating" is understood to mean a grating the profile of which in at least one direction is asymmetric over one period; more precisely, its profile has no symmetry with respect to a point. When over one period, the profile contains a concavity and a convexity, in an asymmetric profile the concavity is different from the convexity. In other words, the concavity seen from the verso is different from the concavity seen from the recto.

Pseudo-sinusoidal profiles are one example of such asymmetric profiles.

Exemplary pseudo-sinusoidal profiles are given by the cycloidal profiles defined by:

$$x = a \cdot t - b \cdot \sin(t)$$

$y = a - b \cdot \cos(t)$ where a and b are real and nonzero and where $1 < |a|/|b| < 5$ and for example $1 < |a|/|b| < 2$.

Figure 5A:
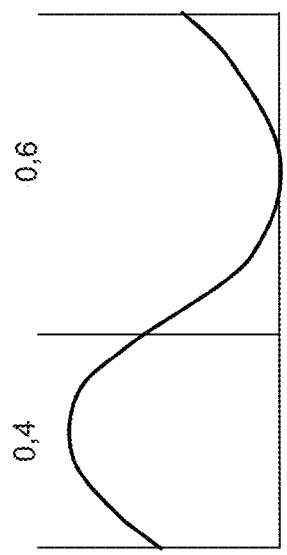
Figure 5B:
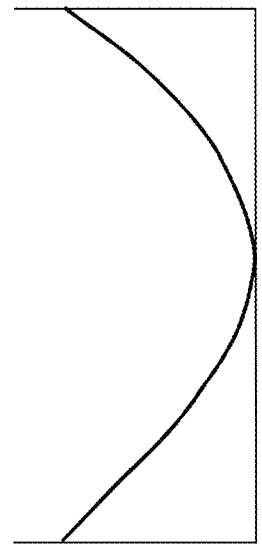
Figure 5C:
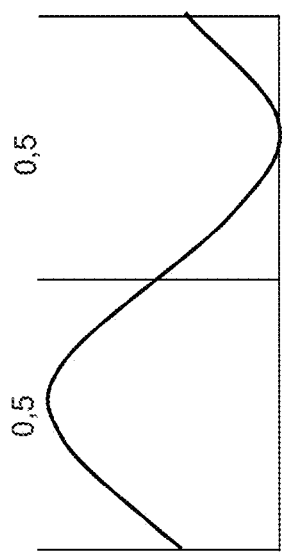
Figure 5D:
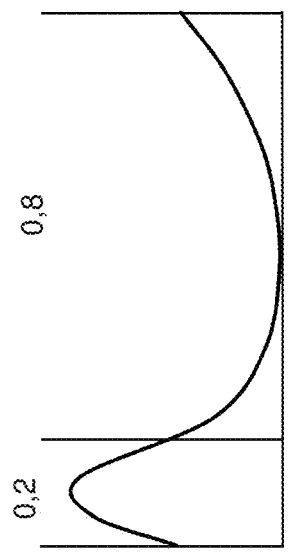

FIGS. 5A to 5C illustrate various grating profiles the pseudo-sinusoidal profiles of which are suitable for a security optical component according to the present description (FIGS. 5B, 5C, 5D), compared to a reference sinusoidal profile (FIG. 5A). The profiles shown are cross-sectional views in one of the main directions of the 2-D grating, for example in the direction of the grating vector. In the present description the expression "pseudo-sinusoidal profile" is understood to mean a profile that is not perfectly sinusoidal, i.e. one that has a duty cycle over one period different from 0.5, the duty cycle being the length of one half-oscillation divided by the total period. Advantageously, to obtain a sufficient asymmetry effect, the duty cycle is chosen to be strictly lower than 0.4 (or 40%). Thus, FIG. 5B illustrates a pseudo-sinusoidal profile of duty cycle equal to 0.4; FIG. 5C illustrates a pseudo-sinusoidal profile of duty cycle equal to 0.2 and FIG. 5D illustrates an extreme pseudo-sinusoidal profile the duty cycle of which is almost 0, i.e. a profile one half-oscillation of which is very small relative to the other. In the latter case, the profile tends toward a profile taking the form of a number of "cuvettes", such as illustrated in FIG. 1, 2 or 3 for example.

The profile of the asymmetric gratings is however not limited to a pseudo-sinusoidal profile, although the pseudo-sinusoidal profile is easiest to manufacture. FIGS. 5E to 5G thus illustrate other types of possible profiles. In each and every case an absence of symmetry is observed over one period.

Figure 6:
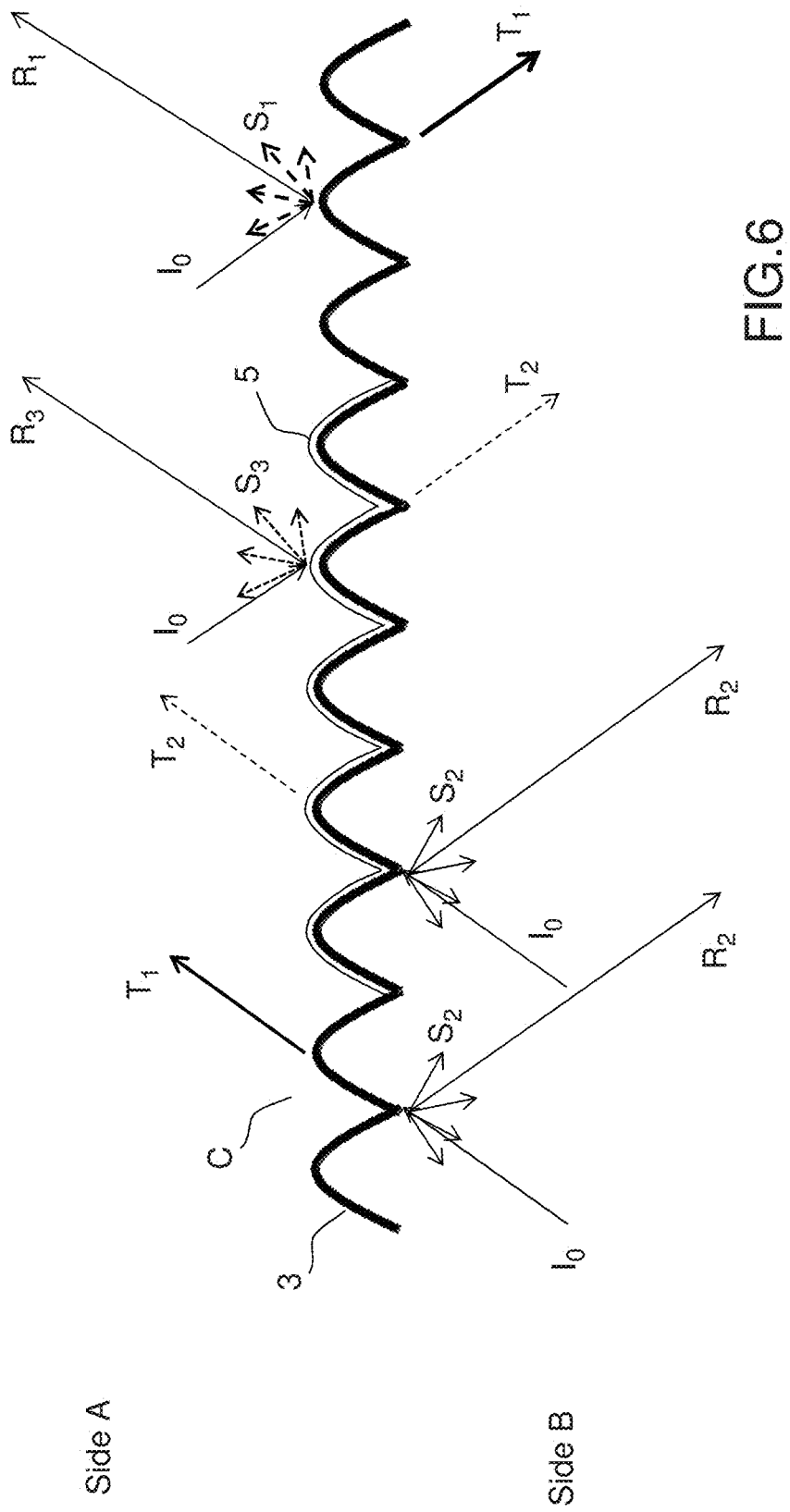
FIG. 6, a schematic illustrating reflection, scattering and transmission effects from both sides of structured metal-dielectric interfaces in a first zone with a high-index dielectric layer deposited on a region of one of the interfaces.

FIGS. 6 and 7 illustrate a second embodiment of a security optical component according to the present description (simplified cross-sectional view) and FIG. 8 illustrates the resulting visual effects. In this example, a layer 5 made of dielectric is present on a region of at least one of the metal-dielectric interfaces.

FIGS. 6 and 7 illustrate a component of the same type as that shown in FIG. 2, but once again, to simplify the drawings, only the metal layer 3 and the layer 5 made of high-index dielectric have been illustrated.

As illustrated in FIG. 6, relative to the effects shown in FIG. 3, the presence of a layer made of high- or low-index dielectric causes a variation ($T_2$) in transmission when the component is observed on one or other side. It also causes a variation in the losses ($S_3$) due to diffraction and scattering creating a difference ($R_3$) in reflection, but only when the component is observed from the side of the interface bearing the high- or low-index layer (side A in FIGS. 6 and 7). The variation in transmission is explained by the variation in the index of the dielectric, which modifies the effective index of the plasmon and therefore the transmitted wavelength. The variation in the losses due to diffraction and scattering is explained by the modification of the dielectric index, which modifies the conditions of diffraction, scattering and of coupling to the plasmon modes.

It is thus possible to distinguish 4 zones in FIG. 7: one zone 1 with a first grating $C_1$; one zone 2 with the same grating $C_1$ but that comprises, on the side-A (recto) side of the metal-dielectric interface, a layer 5 made of high- or low-index dielectric; one zone 3 with a second grating C2 that, once again, is the negative of the grating C1 and over which the layer 5 made of high- or low-index dielectric extends; and lastly, one zone 4 with the same grating C2 but without the high- or low-index layer. In order to produce more characteristic visual effects the zones 2 and 3 form recognizable graphical shapes, as is illustrated in FIGS. 8A to 8D.

As regards zones 1 and 4, the visual effects are identical to those described with reference to FIGS. 3 and 4. In particular, the behavior of the extraordinary transmission effect ($T_1$) in terms of intensity and spectrum is identical no matter which side these two zones are observed from. In contrast, the reflection differs depending on which side of the component is observed and is inverted in these two zones. With the presence of the high- or low-index dielectric layer (zones 2 and 3), the transmission changes with respect to zones 1 and 4 but remains the same in terms of behavior in zones 2 and 3 whatever the side observed. Thus, as may be seen in FIGS. 8B and 8D, the behavior of the visual effect once again remains the same in transmission no matter which side of the component is observed; however, in this example, the zones 2 and 3 here form a recognizable graphical shape ("HI") in transmission. Noteworthily, as is illustrated in FIG. 8C, when side B (verso), which side corresponds to the side of the interface not bearing the high- or low-index layer 5, is observed in reflection, the reflection is constant in each of zones 1 and 2 on the one hand (reflection $R_2$) and zones 3 and 4 on the other hand (reflection $R_1$). The symbol "HI" is not observed to appear in reflection. In contrast, on the recto side the presence of the high- or low-index dielectric layer 5 modifies the reflection because of the variation in the losses due to scattering and diffraction (respectively $S_3$ in the zone 2 and $S_4$ in the zone 3). Thus, reflections with different intensities and spectrums are observed in each of the zones and the graphical sign "HI" appears in reflection on the recto of the component.

The component thus described has an additional authentication level relative to the component described with reference to FIGS. 3 and 4, this additional level resulting from a recognizable graphical sign appearing in reflection on only one of the sides of the component.

Security components such as described above may for example be produced using the manufacturing methods described with reference to FIGS. 9 to 11.

Figure 9E:
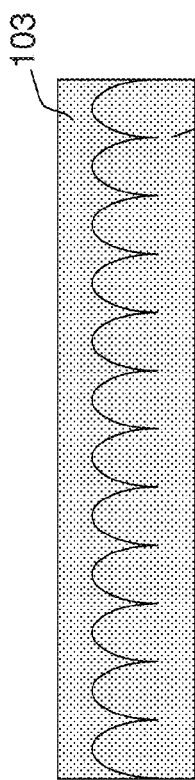
FIGS. 9A to 9F, schematics illustrating the manufacture of first and second dies for forming the first and second coupling gratings.
Figure 9F:
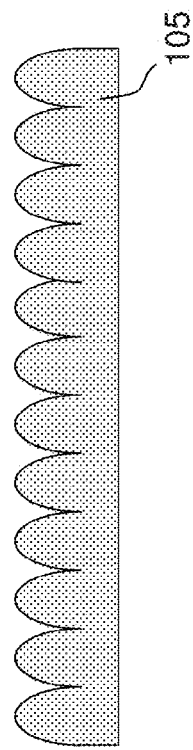
Figure 9A:
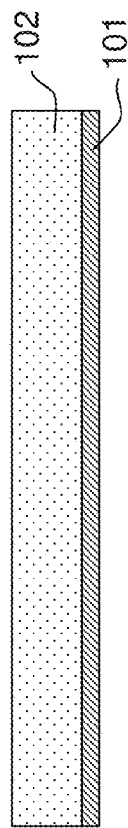
Figure 9B:
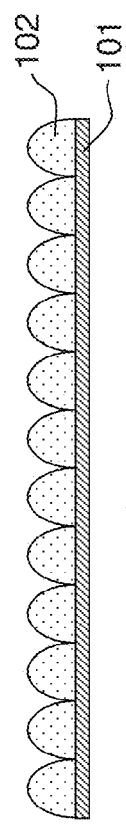
Figure 9C:
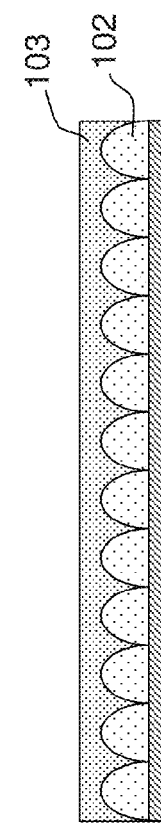
Figure 9D:
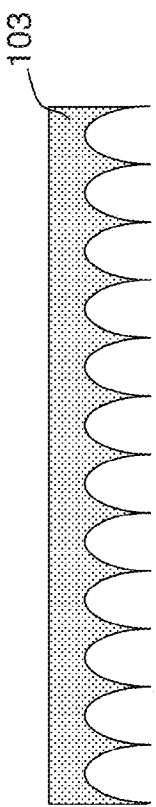
Figure 10C:
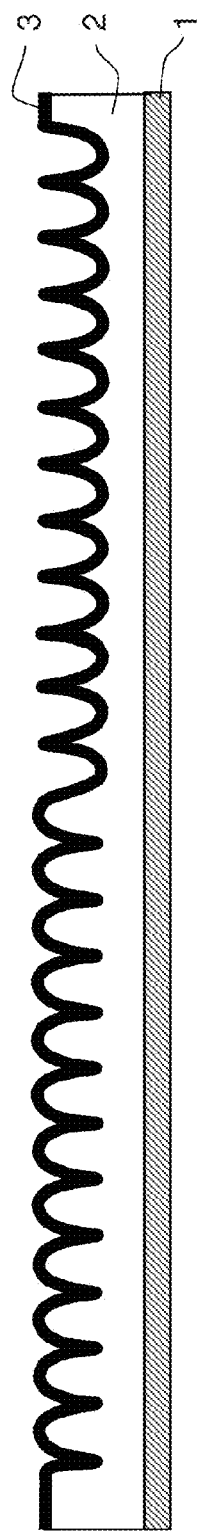
Figure 10D:
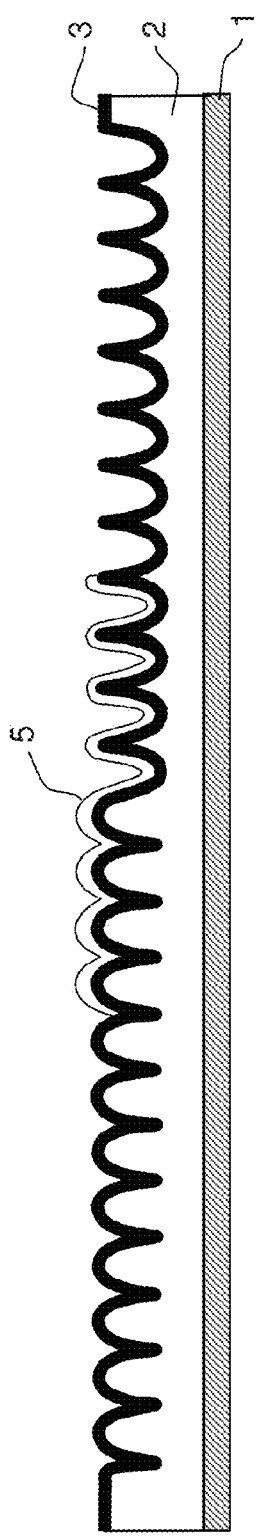
Figure 10E:
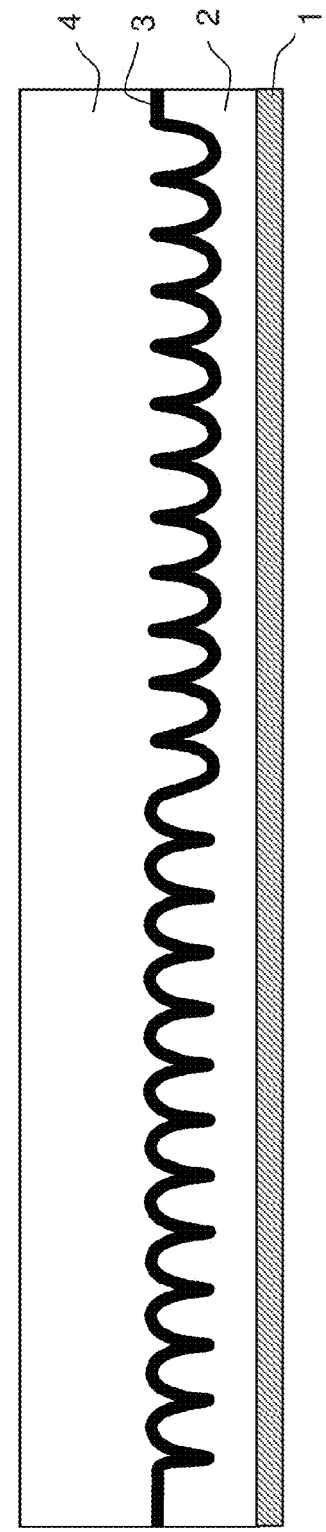

In a first step described by way of example with reference to FIGS. 9A to 9F, dies or "hubs" are obtained for creating the microstructures that will then be added to films with a view to producing the component. In an initial step illustrated in FIG. 9A, optical microstructures intended to form a first two-dimensional coupling grating are recorded by photolithography or electron-beam lithography in a photoresist 102 carried by a substrate 101. The asymmetric profile of the microstructures may be obtained by suitably choosing the linearity of the response of the photoresist used. The photoresist in question is used in its zone of nonlinearity and hence an increase in the amount of energy delivered to the photoresist no longer delivers a corresponding increase in depth after chemical development. Highly asymmetric profiles are obtained by this method. A step of chemical development (FIG. 9B) allows the optical microstructures thus obtained to be revealed. Then an electroplating step (FIG. 9C) allows these microstructures to be transferred to a resistant material, for example a material based on nickel, to produce a first master 103 or "hub" (FIG. 9D) forming in this example a negative first replica. A positive replica 105 (FIG. 9F), for example also based on nickel, may be obtained by a second electroplating step (FIG. 9E). Thus, a first master 103 and a second master 105 are obtained, each master being the negative of the other, it being possible to transfer the pattern of these dies to a film to form security optical components such as illustrated for example in FIGS. 1 and 2.

FIGS. 10A to 10E thus illustrate a first example of manufacture of a security optical component such as shown in FIG. 1 or 2.

In this first example, a double positive and negative structure (FIG. 10A) is obtained in one and the same for example nickel-based master 106 by an assembly technique. The optical microstructures of the master 106 are transferred by stamping a layer 2 made of a dielectric, typically a stamping lacquer of a few microns thickness carried by a 12 µm to 15 µm thick film 1 made of a polymer and for example PET (polyethylene terephthalate). The refractive index of the layer formed from the stamping lacquer is typically 1.5. Other technical lacquer layers (not shown) may be present between the layer 2 and the film 1. The stamped layer (FIG. 10B) is obtained by hot embossing the dielectric material or by UV casting or UV curing. Next the layer thus embossed is metallized (FIG. 10C) allowing a metal layer 3 to be formed. The metallization, the thickness of which is perfectly controlled, is carried out under vacuum and for example with one of the following metals: silver, aluminum, gold, chromium, copper etc. A sealing layer 4 of controlled refractive index is then applied (FIG. 10E), for example by a coating method. For certain applications, such as hot stamping or lamination products, this layer may be the adhesive layer. The sealing layer, which forms the layer 4 (FIG. 1) has a refractive index substantially identical to that of the embossed layer 2, i.e. about 1.5, and a thickness of about one micron (0.5 to 2 or more) to several microns. Depending on the intended end use of the product, an adhesive may be applied to the sealing layer. According to one embodiment shown in FIG. 10D, it is possible to deposit on a given region a dielectric layer 5 of high or low index; the dielectric layer 5 of high or low index may be deposited before or after the metallization, for example before the metallization. A component of the same type as that shown in FIG. 2 is thus obtained.

FIGS. 11A to 11F illustrate a second example of manufacture of a security optical component such as shown in FIG. 1 or 2.

Figure 11A:
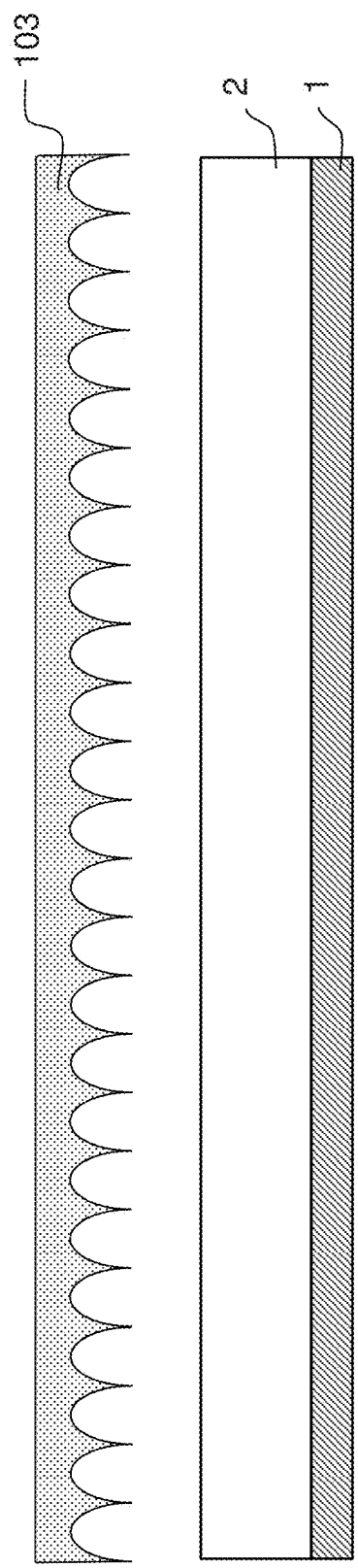
Figure 11B:
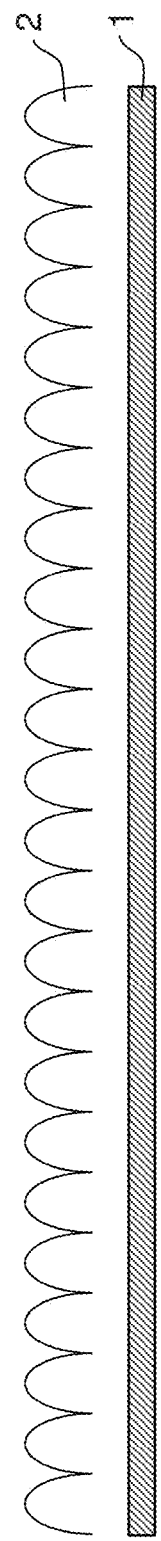
Figure 11E:
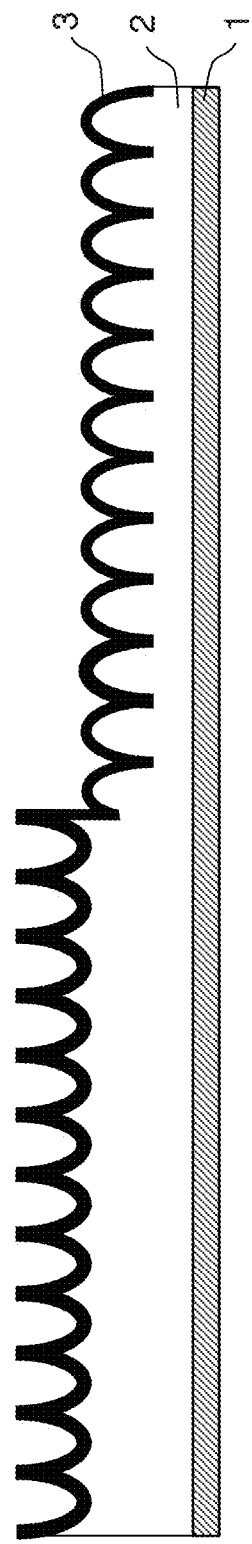
Figure 11F:
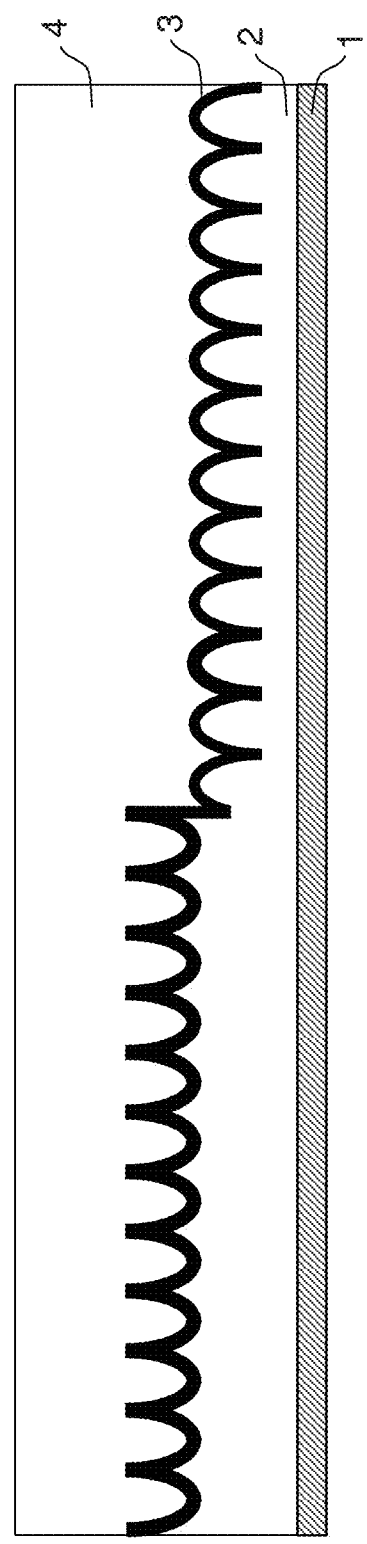

In this example, the pattern of only one of the master replicas, for example the negative master replica 103, is transferred to the dielectric layer 2 (FIG. 11A), allowing a positive structure to be obtained right across the film (FIG. 11B). In one zone of the film 2 thus structured, a resin 6 is deposited (FIG. 11C) so as to partially cover the film, for example a resin that is sensitive in the UV and of refractive index similar to that of the film 2, thus allowing the microstructures in the covered zone of the film to be "erased". The initial structure is however still present in one section of the film 2. The pattern of the other master replica, in this example the positive master replica 105, is then transferred to the resin 6 for example by flash UV curing, in order to obtain a film 2 presenting the two positive and negative structures (FIG. 11D). As above, a metallization is carried out (FIG. 11E) and then the sealing layer 4 is applied (FIG. 11F). Optionally, a dielectric layer is applied before or after the metallization, as in the example illustrated in FIG. 10D.

According to one of the various methods for manufacturing a security optical component according to the present description, it is possible in the metallization step to apply a plurality of different metals, for example in order to seek to obtain different visual effects. To do this, a given pattern will possibly for example be applied with a soluble ink to the embossed layer. During the metallization with the first metal, the latter is applied uniformly over the layer but, after the ink has been removed, remains only in those zones in which there was no ink. Next, a selective second metallization is carried out also comprising a prior step of printing a soluble ink allowing the zones of application of the second metal to be selected. It is possible during the application of the second metal for the metal layers to superpose locally, forming zones of high optical density, or, in contrast, for non-metallized zones to result which, once filled with the sealing layer, will form transparent zones in the component. According to one or more embodiments, the various metal zones may correspond to various coupling zones. In other words, the first metal is applied to a first coupling zone, whereas the second metal is applied to a second coupling zone, allowing distinct color effects to be obtained in the various coupling zones. Alternatively, the various metals may be deposited in zones that do not correspond to the coupling zones.

The methods described above for manufacturing a security optical component are compatible with methods for manufacturing known prior-art security optical components and especially DOVID type components.

In particular, it is possible to produce a security optical element comprising one or more plasmonic components such as described above and one or more other types of security optical component, for example holographic components. To do this a master may be produced by recording various patterns corresponding to the various security optical components in the photoresist 102. Stamping may then be carried out using the master in order to transfer the various microstructures to the polymer film intended to be embossed. The metallization the thickness of which is controlled for the plasmonic-effect components may be deposited right across the film, because it is perfectly compatible with other DOVID-type components operating in reflection.

FIGS. 12A and 12B show a secure document 200, which in the example shown is a banknote type document of value, equipped with a security element 210 comprising a plasmonic security optical component 10 and other security optical components 211 that are for example holographic components. FIG. 12A shows this component from above and FIG. 12B shows a view from below. The security element 210 takes the form of a thread, typically 15 mm in width, that is fastened to a substrate 212 of the document 200. The security element 210 is fastened to the substrate 212 by known means. For example, in the case of a document comprising a solid transparent zone, the security element may be fastened by a hot stamping operation that reactivates a transparent adhesive layer applied beforehand to the sealing layer 4 (see FIG. 1 or 2). In this case, a release layer (for example a wax) may be applied between the stamping lacquer 2 and the carrier film 1 made of PET. It is possible, for example, to transfer the security element to the document by pressing the security element onto the document hot or cold, the plasmonic component being placed facing the transparent zone. During the transfer, the adhesive film sticks to the substrate 212 of the document and the release layer and the carrier film are removed. A transparent window 213 is provided in the substrate 212 in register with the plasmonic component 10. Seen from above, all the security optical components will be visible on the secure document 200 and checkable in reflection according to various known prior-art methods. Seen from below, only the one or more plasmonic components will be visible; they may be checked in reflection and in transmission, as was described above.

It is also possible to adapt this security component to any other documents that are able to be authenticated in reflection and particularly to documents including a transparent zone such as plastic (polycarbonate) documents used in credit-card or indeed passport-page format.

Although described by way of a certain number of embodiments, the security optical component according to the disclosure and the method for manufacturing said component comprise various variants, modifications and improvements that will appear obvious to those skilled in the art, it being understood that these various variants, modifications and improvements form part of the scope of the invention such as defined by the following claims.

The invention claimed is:

1. A plasmonic-effect security optical component, comprising:
two layers made of transparent dielectric, a metal layer arranged between said transparent dielectric layers so as to form two dielectric-metal interfaces, wherein said metal layer is structured to form:
in a first coupling zone, a first periodic two-dimensional coupling grating ($C_1$) able to couple surface plasmon modes supported by said dielectric-metal interfaces to an incident light wave, the first coupling grating exhibiting a first direction and a second direction and having an asymmetric profile without central symmetry in the first direction and the second direction, and,
in a second coupling zone, a second periodic two-dimensional coupling grating ($C_2$) able to couple surface plasmon modes supported by said dielectric-metal interfaces to an incident light wave, the second coupling grating exhibiting the first direction and the second direction and having an asymmetric profile, without central symmetry in the first direction and the second direction, which profile is different from that of the first coupling grating when it is seen from the same side of the component as the first coupling grating,
and wherein the second coupling grating is a negative of the first coupling grating and a pitch of each coupling grating in the first direction and the second direction is comprised between 100 nm and 600 nm and a height of each coupling grating is comprised between 10% and 50% of the pitch of the corresponding first coupling grating and second coupling grating.

2. The security optical component as claimed in claim 1, wherein the periods of each of the first and second coupling gratings are identical in the first direction and the second direction.

3. The security optical component as claimed in claim 1, wherein the profile in each of the two directions of the first and second coupling gratings is a pseudo-sinusoidal profile having a duty ratio strictly lower than 40%.

4. The security optical component as claimed in claim 1, furthermore comprising, in a region of at least one of said metal-dielectric interfaces, a layer made of high- or low-index dielectric.

5. The security optical component as claimed in claim 4, wherein said layer made of high- or low-index dielectric forms a recognizable pattern.

6. A security optical element intended to make a document secure and comprising at least one security optical component as claimed in claim 1.

7. A secure document comprising a substrate and a security optical component as claimed in claim 1, wherein the security optical element is fastened to said substrate, said substrate comprising a transparent zone in which said security optical component is arranged.

\* \* \* \* \*